United States Patent
Ottonello et al.

(10) Patent No.: US 8,771,426 B2
(45) Date of Patent: Jul. 8, 2014

(54) PROCESS FOR RECOVERING SUGARS FROM A PRETREATMENT STREAM OF LIGNOCELLULOSIC BIOMASS

(75) Inventors: Piero Ottonello, Genoa (IT); Simone Ferrero, Tortona (IT); Paolo Torre, Arenzano (IT); Francesco Cherchi, Novi Ligure (IT); Danilo Defaveri, Novi Ligure (IT)

(73) Assignee: Beta Renewables, S.p.A., Tortona(AL) (IT)

( * ) Notice: Subject to any disclaimer, the term of this patent is extended or adjusted under 35 U.S.C. 154(b) by 0 days.

(21) Appl. No.: 13/817,865

(22) PCT Filed: Sep. 29, 2011

(86) PCT No.: PCT/IB2011/054293
§ 371 (c)(1),
(2), (4) Date: Feb. 20, 2013

(87) PCT Pub. No.: WO2012/042497
PCT Pub. Date: Apr. 5, 2012

(65) Prior Publication Data
US 2013/0146049 A1    Jun. 13, 2013

(30) Foreign Application Priority Data
Sep. 29, 2010 (IT) .............................. TO2010A0792

(51) Int. Cl.
*C08B 1/00* (2006.01)
(52) U.S. Cl.
USPC .......................................................... 127/34
(58) Field of Classification Search
USPC .......................................................... 127/34
See application file for complete search history.

(56) References Cited

U.S. PATENT DOCUMENTS

| 4,152,197 A * | 5/1979 | Lindahl et al. ................. 162/19 |
| 4,552,616 A | 11/1985 | Kauppi |
| 2009/0221814 A1 * | 9/2009 | Pschorn et al. ............... 536/128 |

FOREIGN PATENT DOCUMENTS

| WO | WO 98/14270 | * | 4/1998 | ................ B01J 3/00 |
| WO | 0132715 A1 | | 5/2001 | |
| WO | 2009108773 A1 | | 9/2009 | |

OTHER PUBLICATIONS

International Search Report.

* cited by examiner

*Primary Examiner* — Melvin C Mayes
*Assistant Examiner* — Douglas Call
(74) *Attorney, Agent, or Firm* — Edwin A. Sisson, Attorney at Law, LLC

(57) ABSTRACT

The process is for pretreating a lignocellulosic biomass feedstock and comprises: soaking a lignocellulosic biomass feedstock wherein the soaked biomass is present as a mixture with a free liquid and wherein the free liquid comprises at least one dissolved compound selected from the group consisting of glucose, xylose and respective oligomers thereof, washing the mixture of the soaked biomass and the free liquid, wherein at least a portion of the free liquid containing at least one dissolved compound selected from the group consisting of glucose, xylose and respective oligomers thereof is separated from the soaked biomass to create a soaked washed biomass and at least one free liquid stream, compressing the soaked biomass to create a released liquid, separating the released liquid from the soaked biomass, and keeping at least a portion of the released liquid separate from any free liquid.

11 Claims, 1 Drawing Sheet

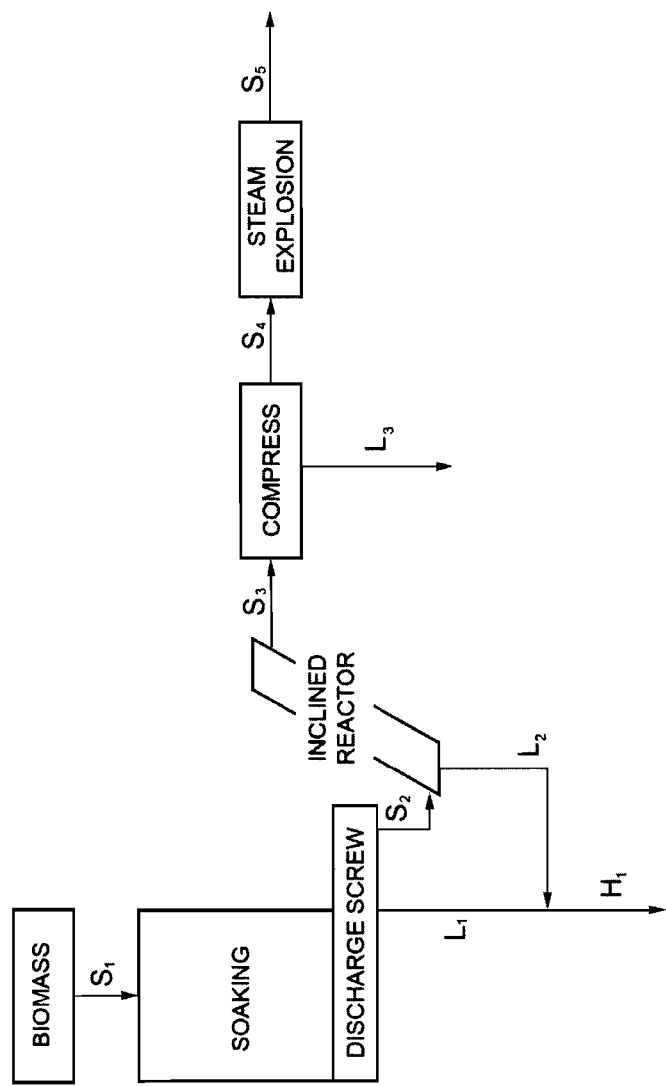

PROCESS FOR RECOVERING SUGARS FROM A PRETREATMENT STREAM OF LIGNOCELLULOSIC BIOMASS

PRIORITY AND CROSS REFERENCES

This patent application claims the priority from PCT/IB2011/054293 filed on 29 Sep. 2011 which claims priority from Italian Patent Application Number TO2010A000792 filed on 29 Sep. 2010, the teachings of both of which are incorporated in their entirety.

BACKGROUND

Separate pretreatment of lignocellulosic biomass prior to steam explosion is known in the art. WO 2009/108773 discloses a process for pretreating cellulosic biomass feed stock including: a first pressurized reactor receiving the feed stock, wherein the feed stock undergoes hydrolysis; a sealing device having a first pressurized coupling to a feedstock discharge port of the first pressurized reactor, and a second pressurized coupling to a second pressurized reactor; a drain for a liquid including dissolved hemi-cellulosic material extracted from the feed stock in at least one of the first pressurized reactor and the sealing and extraction device; the second pressurized reactor assembly receiving the pressurized feed stock from the sealing device at a pressure substantially greater than the pressure in the first pressurized reactor, wherein cells of the feed stock are infused with water in the second pressurized reactor; and an expansion device downstream of the second pressurized reactor assembly, wherein the expansion device rapidly releases the pressure of the feed stock discharged from the second pressurized reactor such that the feed stock undergoes a steam explosion reaction.

The figures and embodiments of WO 2009/108733 all disclose the combining of all the liquid extraction streams that occur prior to the steam explosion reaction.

Because these configurations and embodiments teach the combination of all the streams, WO 2009/108733 fails to disclose a design which takes advantage of separating of the streams, therefore an improved design is needed which takes advantage of the separate streams.

SUMMARY

Disclosed in the specification for a process to pretreat a lignocellulosic biomass feedstock comprised of: soaking a lignocellulosic biomass feedstock wherein the soaked biomass is present as a mixture with a free liquid and wherein the free liquid comprises at least one dissolved compound selected from the group consisting of glucose, xylose and respective oligomers thereof, washing the mixture of the soaked biomass and the free liquid, wherein at least a portion of the free liquid containing at least one dissolved compound selected from the group consisting of glucose, xylose and respective oligomers thereof is separated from the soaked biomass to create a soaked washed biomass and at least one free liquid stream, compressing the soaked biomass to create a released liquid, separating the released liquid from the soaked biomass, and keeping at least a portion of the released liquid separate from any free liquid. As used in the present specification, the term "liquid" in the expression "free liquid" refers to matter that may be present in vapor and/or liquid states.

It is further disclosed that the soaking is conducted in a soaking reactor and at least a portion of the released liquid is introduced into the soaking reactor.

It is also disclosed that the ratio of the amount of liquid in the biomass feedstock plus the amount of liquid added to the amount of dry matter can be within the ranges of 0.5:1 to 10:1, 0.5:1 to 5:1, 0.8:1 to 10:1, 1:1 to 10:1, and 1:1 to 5:1.

It is further disclosed that the ratio of the weight of free liquid removed to the amount of compressed liquid removed can be within the ranges of 1:1 to 5:1, 1.5:1 to 4:1 and 2:1 to 4:1.

It is further disclosed that the separation of the portion of the free liquid from the soaked biomass is performed in more than one location prior to the pressing step and that there can be more than one washing step.

It is further disclosed that the compression ratio of the compression step be within the range of 1.5 to 10.

It is also disclosed that the soaking be performed at a pressure at least 1.5 bar and at a temperature of at least 110 degrees Celsius to create a soaked biomass.

BRIEF DESCRIPTION OF THE DRAWINGS

FIG. 1 is a schematic of one of the embodiments of the invention.

DETAILED DESCRIPTION

The feed stock for this process is a lignocellulosic biomass. Lignocellulosic materials can be described as follows: apart from starch, the three major constituents in plant biomass are cellulose, hemicellulose and lignin, which are commonly referred to by the generic term lignocellulose. Polysaccharide-containing biomasses as a generic term include both starch and lignocellulosic biomasses. Therefore, some types of feedstocks for pretreatment can be plant biomass, polysaccharide containing biomass, and lignocellulosic biomass.

If the biomass is a polysaccharide-containing biomass and it is lignocellulosic, the pretreatment is often used to ensure that the structure of the lignocellulosic content is rendered more accessible to the enzymes, and at the same time the concentrations of harmful inhibitory by-products such as acetic acid, furfural and hydroxymethyl furfural remain substantially low.

Polysaccharide-containing biomasses according to the present invention include any material containing polymeric sugars e.g. in the form of starch as well as refined starch, cellulose and hemicellulose.

Relevant types of biomasses for pretreatment and subsequent precipitation according to the present invention may include biomasses derived from agricultural crops such as e.g.: starch e.g. starch containing grains and refined starch; corn stover, bagasse, straw e.g. from rice, wheat, rye, oat, barley, rape, sorghum; softwood e.g. *Pinus sylvestris, Pinus radiate*; hardwood e.g. *Salix* spp. *Eucalyptus* spp.; tubers e.g. beet, potato; cereals from e.g. rice, wheat, rye, oat, barley, rape, sorghum and corn; waste paper, fiber fractions from biogas processing, manure, residues from oil palm processing, municipal solid waste or the like.

The lignocellulosic biomass feedstock is preferably from the family usually called grasses. The proper name is the family known as Poaceae or Gramineae in the Class Liliopsida (the monocots) of the flowering plants. Plants of this family are usually called grasses, or, to distinguish them from other graminoids, true grasses. Bamboo is also included. There are about 600 genera and some 9,000-10,000 or more species of grasses (Kew Index of World Grass Species).

Poaceae includes the staple food grains and cereal crops grown around the world, lawn and forage grasses, and bamboo. Poaceae generally have hollow stems called culms, which are plugged (solid) at intervals called nodes, the points along the culm at which leaves arise. Grass leaves are usually alternate, distichous (in one plane) or rarely spiral, and parallel-veined. Each leaf is differentiated into a lower sheath which hugs the stem for a distance and a blade with margins usually entire. The leaf blades of many grasses are hardened with silica phytoliths, which helps discourage grazing animals. In some grasses (such as sword grass) this makes the edges of the grass blades sharp enough to cut human skin. A membranous appendage or fringe of hairs, called the ligule, lies at the junction between sheath and blade, preventing water or insects from penetrating into the sheath.

Grass blades grow at the base of the blade and not from elongated stem tips. This low growth point evolved in response to grazing animals and allows grasses to be grazed or mown regularly without severe damage to the plant.

Flowers of Poaceae are characteristically arranged in spikelets, each spikelet having one or more florets (the spikelets are further grouped into panicles or spikes). A spikelet consists of two (or sometimes fewer) bracts at the base, called glumes, followed by one or more florets. A floret consists of the flower surrounded by two bracts called the lemma (the external one) and the palea (the internal). The flowers are usually hermaphroditic (maize, monoecious, is an exception) and pollination is almost always anemophilous. The perianth is reduced to two scales, called lodicules, that expand and contract to spread the lemma and palea; these are generally interpreted to be modified sepals.

The fruit of Poaceae is a caryopsis in which the seed coat is fused to the fruit wall and thus, not separable from it (as in a maize kernel).

There are three general classifications of growth habit present in grasses; bunch-type (also called caespitose), stoloniferous and rhizomatous.

The success of the grasses lies in part in their morphology and growth processes, and in part in their physiological diversity. Most of the grasses divide into two physiological groups, using the C3 and C4 photosynthetic pathways for carbon fixation. The C4 grasses have a photosynthetic pathway linked to specialized Kranz leaf anatomy that particularly adapts them to hot climates and an atmosphere low in carbon dioxide.

C3 grasses are referred to as "cool season grasses" while C4 plants are considered "warm season grasses". Grasses may be either annual or perennial. Examples of annual cool season are wheat, rye, annual bluegrass (annual meadowgrass, *Poa annua* and oat). Examples of perennial cool season are orchardgrass (cocksfoot, *Dactylis glomerata*), fescue (*Festuca* spp), Kentucky Bluegrass and perennial ryegrass (*Lolium perenne*). Examples of annual warm season are corn, sudangrass and pearl millet. Examples of Perennial Warm Season are big bluestem, indiangrass, bermudagrass and switchgrass.

One classification of the grass family recognizes twelve subfamilies: these are 1) anomochlooideae, a small lineage of broad-leaved grasses that includes two genera (*Anomochloa, Streptochaeta*); 2) Pharoideae, a small lineage of grasses that includes three genera, including *Pharus* and *Leptaspis;* 3) Puelioideae a small lineage that includes the African genus *Puelia;* 4) Pooideae which includes wheat, barley, oats, brome-grass (Bronnus) and reed-grasses (*Calamagrostis*); 5) Bambusoideae which includes bamboo; 6) Ehrhartoideae, which includes rice, and wild rice; 7) Arundinoideae, which includes the giant reed and common reed 8) Centothecoideae, a small subfamily of 11 genera that is sometimes included in Panicoideae; 9) Chloridoideae including the lovegrasses (*Eragrostis*, ca. 350 species, including teff), dropseeds (*Sporobolus*, some 160 species), finger millet (*Eleusine coracana* (L.) Gaertn.), and the muhly grasses (*Muhlenbergia*, ca. 175 species); 10) Panicoideae including panic grass, maize, sorghum, sugar cane, most millets, fonio and blue-stem grasses. 11) Micrairoideae; 12) Danthoniodieae including pampas grass; with *Poa* which is a genus of about 500 species of grasses, native to the temperate regions of both hemispheres.

Agricultural grasses grown for their edible seeds are called cereals. Three common cereals are rice, wheat and maize (corn). Of all crops, 70% are grasses.

Sugarcane is the major source of sugar production. Grasses are used for construction. Scaffolding made from bamboo is able to withstand typhoon force winds that would break steel scaffolding. Larger bamboos and *Arundo donax* have stout culms that can be used in a manner similar to timber, and grass roots stabilize the sod of sod houses. *Arundo* is used to make reeds for woodwind instruments, and bamboo is used for innumerable implements.

Therefore a preferred lignocellulosic biomass is selected from the group consisting of the grasses. Alternatively phrased, the preferred lignocellulosic biomass is selected from the group consisting of the plants belonging to the Poaceae or Gramineae family. Another preferred lignocellulosic biomass is that biomass having at least 5% by weight of it dry matter as cellulose, or more preferably at least 10% by weight of its dry matter as cellulose.

The process will be described herein by referring to FIG. 1. The lignocellulosic biomass feedstock which should contain at least 5% by weight cellulose of the dry matter in the feedstock, and more preferably at least 10% by weight, enters the soaking reactor via $S_1$. Steam is added to the soaking reactor at an exemplary rate of 0.5 kg stm/1 kg biomass feedstock to 10 kg stm/1 kg biomass feedstock, depending upon the severity chosen. The soaking reactor (first pressurized reactor) holds the biomass in the presence of steam for approximately 30 minutes to 3 hours or longer, again depending upon the severity desired. The soaking temperature can range 110° C. to 190° C., or even higher, but with diminishing returns. After soaking the solids/liquid/steam mixture is discharged via solid stream $S_2$ into the inclined reactor, at typically the same pressure of the soaking reactor. As shown in FIG. 1, there is a free liquid stream, $L_1$, coming from the discharge screw. As the discharge screw may create some compression on the solid biomass, this stream, $L_1$, may contain some released liquid as well. The solid biomass is carried up the inclined reactor with the cooled condensate or even added water flowing countercurrent to the solid flow and being removed via free liquid stream $L_2$.

What is meant by free liquid or free water is the water or liquid that can be removed by screening, filtering, gravity flow, without compress the solid mass. A free liquid stream does not necessarily have to be free from released liquid from compression, but at least 50% of the free liquid stream will be free liquid(s). Preferably, a free liquid stream will have no more than 5% by weight released liquid. A free liquid will also contain the soluble products of the hydrolyzed lignocellulosic biomass, which includes acetic acid, glucose, xylose and the soluble oligomers thereof.

The phrase released liquid means that this liquid, usually water containing other dissolved materials, has been released from the soaked biomass, generally released by pressing, squeezing, or otherwise compressing the soaked biomass so as to squeeze out or release the liquid, which is usually water, that is bound in the void areas. This could be accomplished by, but is not limited to, a filter press, a centrifuge, rollers, or a compression screw.

As shown in FIG. 1, free liquid streams $L_1$ and $L_2$ are combined into $H_1$, to Holding Tank 1. If there was only one free liquid stream, $L_2$ and $H_1$ would be the same.

Upon leaving the inclined reactor, the solid biomass is passed via stream $S_3$ to a compression zone in preparation for the steam explosion. The steam explosion occurs after passing through the compression zone. The compression zone will typically have a device to compress the solids and move the solids via stream $S_4$ to the steam explosion where the steam exploded solids are produced and passed to the next unit operation via solid stream $S_5$.

What has been discovered, as shown in Table 1, is that a released liquid stream $L_3$, which is the liquid stream containing at least 50% released liquid, preferably less than 5% by weight free liquid, obtained from pressing or compressing the washed solids has surprisingly virtually no sugars or compounds useful in the subsequent fermentation processes, but has a consistent amount of Acetyl, which is the sum of the free acetic acid and the acetyls which can be converted to Acetic Acid. Similarly, glucans is the sum of the glucose and the gluco-oligomers and gluco-polymer, i.e. cellulose. Xylans is the sum of the xylose and xylo-oligomers and xylo-polymer, i.e. hemicellulose.

The amount of compression in the compression step is expressed as the compression ratio applied to the soaked washed biomass and is preferably in the range of 1.5 to 10, with 1.5 to 5 being more preferable.

Therefore, the removal of released liquid stream, $L_3$, is in itself an advantage. However, because of its acetic acid content, at least a portion of the released liquid stream, $L_3$, obtained from pressing or compressing the solid biomass can be recycled to the soaking reactor which converts the hydrolysis which occurs in the soaking step from an auto-hydrolysis process to an acid catalyzed hydrolysis, where the acid is derived from the lignocellulosic biomass. The advantage of such acid hydrolysis is that there are no added acid compounds which are problematic to remove later—such as sulfuric acid.

The released liquid stream can also be treated prior to introduction into the soaking reactor to remove any specific unwanted compounds, such as furfural. The stream could also be concentrated and further used in the process. Or, the acetic acid could be recovered from the stream.

As can be seen in Table 1, free liquid streams $L_1$ and $L_2$, captured as $H_1$ contain high amounts of sugars relative to released liquid stream, $L_3$, and can be passed on to one or more specific treatments for the sugars contained in the streams or recombined with solid stream.

The process can therefore be described as a process for pretreating a lignocellulosic biomass feed stock comprising: soaking a lignocellulosic biomass feedstock at a pressure in a range of at least 1.5 bar and up to 20 bar, and at a temperature of at least 110° C.; washing the soaked biomass and separating at least a portion of the free liquid wherein the free liquid contains at least one dissolved compound selected from the group consisting of acetic acid, glucose, xylose and the soluble oligomers thereof, compressing the soaked biomass wherein the compression applied to the soaked washed feedstock creates a released liquid and the released liquid is separated from the soaked biomass and at least a portion of the released liquid is not combined or mixed with the free liquid.

As detailed in Table 1, the released liquid is virtually sugar free and at least a portion of the released liquid can be added to the soaking reactor with the lignocellulosic biomass feedstock. As mentioned previously, the released liquid stream may have some free liquid in it. However, it is preferable that the separation of the free liquid be as complete as possible so that no free liquid enters the compression step. By no free liquid, it is meant that the free liquid entering the compression step be less than the amount of the released liquid, and preferably less than 5% of the amount of the free liquid.

There may be an additional step of applying a pressure to the soaked, washed and compressed biomass in a range of 8 bar to 25.5 bar, and passing the feed stock to an expansion device downstream wherein the expansion device rapidly releases the pressure of the feed stock such that the feed stock undergoes a steam explosion reaction.

The process can be further characterized in that the washing is done, only, or at least in part, by the liquid from the condensing steam of the soaking step. This would be done by cooling the material in the inclined reactor so that the condensate would condense at the top and run countercurrent to the flow of the solid soaked biomass moving up the inclined reactor. If desired, additional liquid could be added to wash the soaked biomass at any stage prior to the pressing step.

The inclined reactor is not necessary, as the liquid removal could be done via a filter, a screen, or even a horizontal reactor. Preferably, the reactor has a screw or other mechanism to lift or progress the soaked biomass solids through the reactor.

The free liquid, usually water, can be separated from the soaked biomass at one location or multiple locations, provided it is done prior to the compression step and a sufficient amount of free liquid is separated so that substantially no sugars are present in the released liquid. Substantially no sugars present in the released liquid means that the released liquid has less than 0.1% by weight of dissolved glucose, xylose and their respective oligomers, with 0.05% being more preferred, and 0.025% being the most preferred.

It should be apparent to one of ordinary skill that one way to control the process is to control the amount of liquid exiting the process prior to the pressing step. By controlling the amount of liquid removed prior to the pressing step and knowing the amount of total liquid entering the process (e.g. liquid in the biomass, steam, wash liquid) one by definition controls the amount of liquid necessarily removed at the pressing step as it will include the excess liquid not previously removed, or free liquid, and the addition of the pressed liquid. It is believed that the amount of free liquid entering the compression step should be minimal as it will likely contain sugars and the released liquid from compression will contain substantially no sugars.

It can be seen from Table 1, that the ratio of the amount of liquid (in this case, the water in the feedstock plus the amount of water added) to the amount of dry matter in the feedstock can be in the range of 0.5:1 to 10:1, with 0.5:1 to 5:1 being a preferred range, with 0.8:1 to 10:1 being even more preferred, with 1:1 to 10:1 being a preferred range with 1:1 to 5:1 being the most preferred. The higher the ratio, the more liquid has to be removed and treated.

It can be seen from Table 1, that the ratio of the amount (weight) free liquid separated to the amount of released liquid separated is within the range of 1:1 to 5:1, more preferably 1.5:1 to 4:1, with 2:1 to 4:1 being most preferred. These amounts do not include the dry matter in the streams, which is the amount which remains after the water is evaporated from a sample.

This process can be run as either a batch or continuous process.

TABLE 1

| CODE | | test A | | | | test B | | | | test C | | | |
|---|---|---|---|---|---|---|---|---|---|---|---|---|---|
| Raw Material | | arundo donax | | | | arundo donax | | | | wheat straw | | | |
| Temperature | (° C.) | 155 | | | | 155 | | | | 155 | | | |
| Pressure | (bar) | 4.8 | | | | 4.8 | | | | 4.8 | | | |
| Residence time | (min) | 115 | | | | 125 | | | | 70 | | | |
| | | IN | | OUT | | IN | | OUT | | IN | | OUT | |
| | | feedstock | water | H1 | L3 | feedstock | water | H1 | L3 | feedstock | water | H1 | L3 |
| Flow rate | (kg/h) | 44.6 | 163.2 | 40.2 | 12.7 | 43.4 | 110.0 | 45.8 | 15.9 | 27.8 | 100.0 | 35.5 | 13.1 |
| Dry | (kg/h) | 35.0 | | 2.5 | 0.1 | 34.0 | | 3.0 | 0.2 | 25.0 | | 2.7 | 0.1 |
| Water | (kg/h) | 9.6 | 163.2 | 37.7 | 12.6 | 9.4 | 110.0 | 42.8 | 15.8 | 2.8 | 100.0 | 32.8 | 13.0 |
| Composition (wet basis) | | | | | | | | | | | | | |
| Glucans | (% wt) | 28.36% | | 0.85% | 0.00% | 28.36% | | 0.84% | 0.01% | 38.53% | | 0.93% | 0.00% |
| Xylans | (% wt) | 20.00% | | 2.47% | 0.00% | 20.00% | | 2.53% | 0.00% | 27.16% | | 2.94% | 0.00% |
| Furfural | (% wt) | 0.00% | | 0.12% | 0.10% | 0.00% | | 0.08% | 0.15% | 0.00% | | 0.05% | 0.09% |
| 5-HMF | (% wt) | 0.00% | | 0.03% | 0.00% | 0.00% | | 0.02% | 0.00% | 0.00% | | 0.01% | 0.00% |
| Acetyl | (% wt) | 2.98% | | 0.74% | 0.93% | 2.98% | | 0.60% | 0.70% | 1.83% | | 0.56% | 0.57% |

| CODE | | test D | | | | test E | | | |
|---|---|---|---|---|---|---|---|---|---|
| Raw Material | | rice straw | | | | sugarcane bagasse | | | |
| Temperature | (° C.) | 155 | | | | 155 | | | |
| Pressure | (bar) | 4.8 | | | | 4.8 | | | |
| Residence time | (min) | 70 | | | | 50 | | | |
| | | IN | | OUT | | IN | | OUT | |
| | | feedstock | water | H1 | L3 | feedstock | water | H1 | L3 |
| Flow rate | (kg/h) | 43.1 | 90.0 | 51.1 | 19.1 | 43.2 | 125.0 | 55.1 | 33.7 |
| Dry | (kg/h) | 39.0 | | 2.1 | 0.2 | 36.0 | | 1.9 | 0.1 |
| Water | (kg/h) | 4.1 | 90.0 | 49.0 | 19.0 | 7.2 | 125.0 | 53.3 | 33.6 |
| Composition (wet basis) | | | | | | | | | |
| Glucans | (% wt) | 32.70% | | 1.19% | 0.01% | 30.59% | | 0.18% | 0.01% |
| Xylans | (% wt) | 16.91% | | 2.21% | 0.00% | 21.36% | | 1.45% | 0.00% |
| Furfural | (% wt) | 0.00% | | 0.11% | 0.17% | 0.00% | | 0.05% | 0.10% |
| 5-HMF | (% wt) | 0.00% | | 0.02% | 0.00% | 0.00% | | 0.01% | 0.00% |
| Acetyl | (% wt) | 2.03% | | 0.65% | 0.50% | 1.21% | | 0.26% | 0.16% |

The compositional characteristics were determined using standard analytical methods, the followed procedures are:
Determination of Structural Carbohydrates and Lignin in Biomass
Laboratory Analytical Procedure (LAP) Issue Date: Apr. 25, 2008
*Technical Report* NREL/TP-510-42618 Revised April 2008
Determination of Extractives in Biomass
Laboratory Analytical Procedure (LAP) Issue Date: Jul. 17, 2005
*Technical Report* NREL/TP-510-42619 January 2008
Preparation of Samples for Compositional Analysis
Laboratory Analytical Procedure (LAP) Issue Date: Sep. 28, 2005
*Technical Report* NREL/TP-510-42620 January 2008
Determination of Total Solids in Biomass and Total Dissolved Solids in Liquid Process Samples
Laboratory Analytical Procedure (LAP) Issue Date: Mar. 31, 2008
*Technical Report* NREL/TP-510-42621 Revised March 2008
Determination of Ash in Biomass
Laboratory Analytical Procedure (LAP) Issue Date: Jul. 17, 2005
*Technical Report* NREL/TP-510-42622 January 2008
Determination of Sugars, Byproducts, and Degradation Products in Liquid Fraction Process Samples
Laboratory Analytical Procedure (LAP) Issue Date: Dec. 8, 2006
*Technical Report* NREL/TP-510-42623 January 2008
Determination of Insoluble Solids in Pretreated Biomass Material
Laboratory Analytical Procedure (LAP) Issue Date: Mar. 21, 2008
*Technical Report* NREL/TP-510-42627 March 2008

It should be evident that the claims are not limited to the embodiments of the specification, but that the inventors are entitled to the variations made by one of ordinary skill in the art.

The invention claimed is:

1. A process for the pretreatment of a lignocellulosic biomass feedstock wherein the process is comprised of
   A) soaking a lignocellulosic biomass feedstock wherein the soaked biomass is present as a mixture with a free liquid that is present in a state of matter selected from the group consisting of vapor and liquid states of matter and wherein the free liquid comprises at least one dissolved compound selected from the group consisting of glucose, xylose and respective oligomers thereof,
   B) washing the mixture of the soaked biomass and the free liquid, wherein at least a portion of the free liquid containing at least one dissolved compound selected from the group consisting of glucose, xylose and respective oligomers thereof is separated from the soaked biomass to create a soaked washed biomass and at least one free liquid stream, C) compressing the soaked washed biomass at a compression ratio to create a released liquid, D) separating the released liquid from the soaked washed biomass, and E) keeping at least a portion of the released liquid separate from any free liquid.

2. The process according to claim 1, wherein the soaking is conducted in a soaking reactor and at least a portion of the released liquid is introduced into the soaking reactor.

3. The process according to claim 2, wherein the separation of the portion of the free liquid from the soaked biomass is performed at more than one location prior to the compressing step.

4. The process according to claim 3, wherein there is more than one washing step prior to the compressing step.

5. The process according to claim 2, wherein there is more than one washing step prior to the compressing step.

6. The process according to claim 1, wherein the ratio of the amount of liquid in the biomass feedstock plus the amount of liquid added to the amount of dry matter is within the range of 0.5:1 to 10:1.

7. The process according to claim 1, wherein the ratio of the weight of free liquid removed to the amount of compressed liquid removed is in the range of 1:1 to 5:1.

8. The process according to claim 1, wherein the separation of the portion of the free liquid from the soaked biomass is performed at more than one location prior to the compressing step.

9. The process according to claim 1, wherein there is more than one washing step prior to the compressing step.

10. The process according to claim 1, wherein the compression ratio applied to the soaked washed biomass is within the range of 1.5 to 10.

11. The process according to claim 1, wherein the soaking is performed at a pressure of at least 1.5 bar and at a temperature of at least 110 degrees Celsius to create a soaked biomass.

* * * * *